H. E. CLARKE.
FOOT AND LAST MEASURING DEVICE.
APPLICATION FILED NOV. 14, 1919.
1,410,092.
Patented Mar. 21, 1922.
3 SHEETS—SHEET 2.
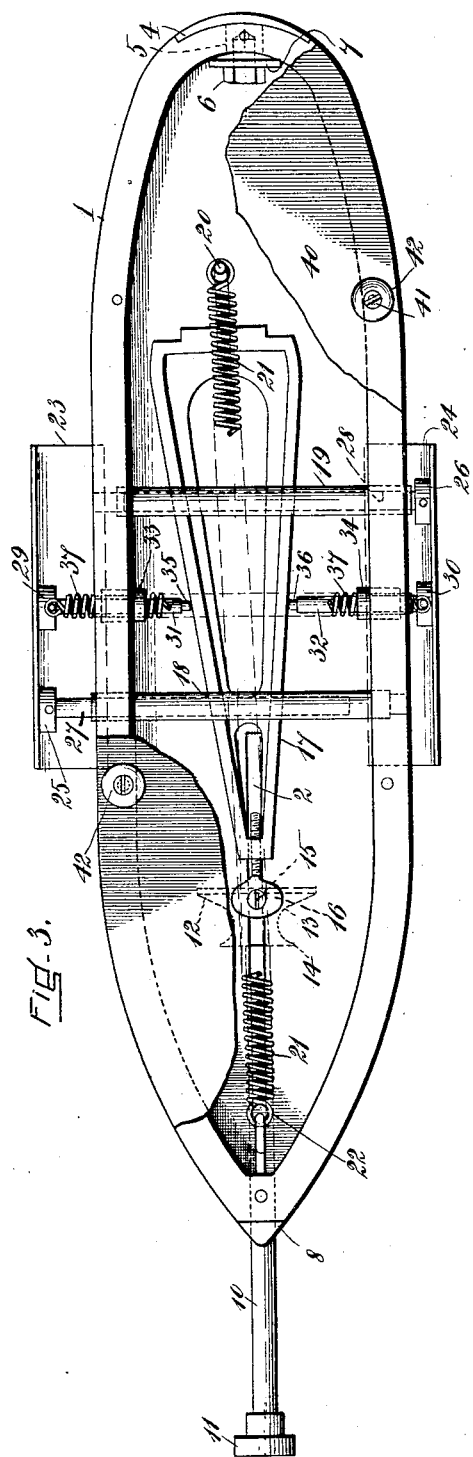
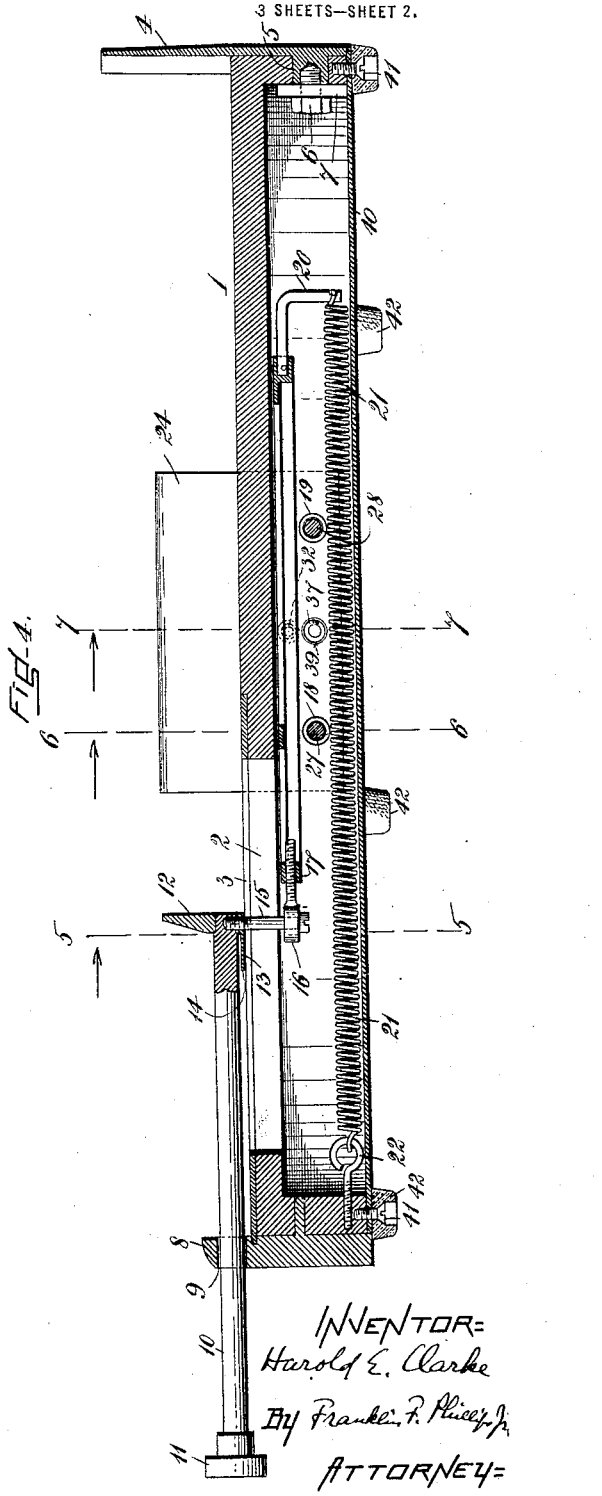

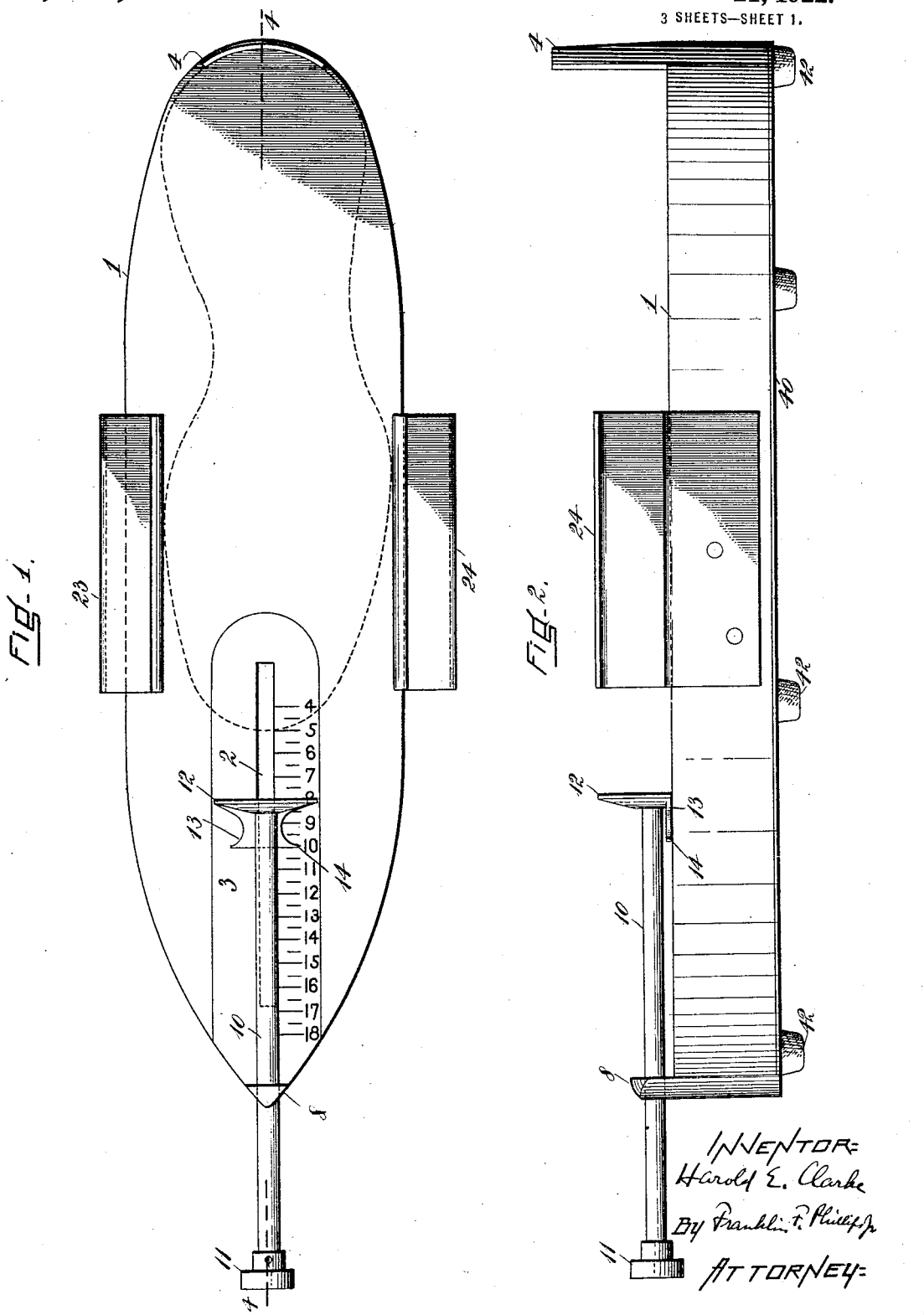

H. E. CLARKE.
FOOT AND LAST MEASURING DEVICE.
APPLICATION FILED NOV. 14, 1919.

1,410,092.
Patented Mar. 21, 1922.
3 SHEETS—SHEET 3.

INVENTOR:
Harold E. Clarke
By Franklin F. Phillips, Jr
ATTORNEY=

UNITED STATES PATENT OFFICE.

HAROLD E. CLARKE, OF WORCESTER, MASSACHUSETTS, ASSIGNOR TO CLARKE-EMERSON MANUFACTURING CO., A CORPORATION OF MASSACHUSETTS.

FOOT AND LAST MEASURING DEVICE.

1,410,092.   Specification of Letters Patent.   Patented Mar. 21, 1922.

Application filed November 14, 1919. Serial No. 338,022.

*To all whom it may concern:*

Be it known that I, HAROLD E. CLARKE, a citizen of the United States, residing at Worcester, in the county of Worcester and State of Massachusetts, have invented a new and useful Foot and Last measuring Device, of which the following is a specification.

My device is an instrument for quickly and accurately determining the length and width of the human foot, or the last upon which shoes are made, in terms of shoe sizes as standardized in common practice. It has been the special object of my invention to make a device which shall combine accuracy with simplicity, strength, ease, and quickness of operation.

My device may be best understood by reference to the accompanying drawings in which:

Fig. 1 is a top view showing the device in operative relation with a foot shown in dotted lines.

Fig. 2 is a side elevation.

Fig. 3 is a bottom view with the casing partly broken away.

Fig. 4 is a section on line 4—4 of Fig. 1.

Figure 5:
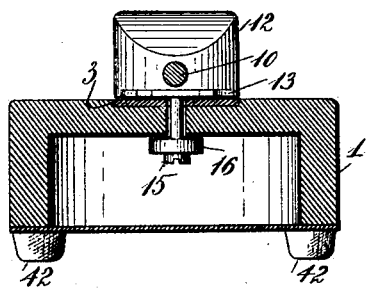
Fig. 5 is a section on line 5—5 of Fig. 4, viewed in the direction of the arrow.

Referring more specifically to the drawings, 1 is a casing preferably made of wood and provided with a slot 2 which registers with a corresponding slot in metallic plate 3 which is mounted flush with the top of casing 1, and is provided with a scale of shoe sizes, in terms of length, as shown in Fig. 1.

A heel plate 4 is provided with a lug 5 entering the wooden casing 1 which lug is tapered and threaded to receive bolt 6 which passes through washer 7 and thus retains the heel plate 4 securely in place. A post 8 attached to the front of casing 1 and extending above the top thereof is provided with a hole 9 through which passes rod 10 which has at one end a knob 11 and at the other end a toe plate 12 which has a base 13 slidably bearing on the plate 3. The base 13 is shaped to form an indicator 14 with respect to the scale on plate 3.

Extending through slot 2 is a post 15 screwed into the base 13 of toe plate 12. This post 15 serves as a guide for sliding the rod 10. The post 15 passes loosely through the head of thumb nut 16 which is screwed into the forward end of the wedge 17 (to be hereinafter described), which is free to slide on the top of brass bushings 18 and 19 mounted between the sides of the casing 1 in holes therein. On a downwardly extending bracket 20 on the rear portion of the wedge member 17 is fastened a coil spring 21 which passes under the bushings 18 and 19 and is attached to the inside of the forward end of casing 1 by screw hook 22. This coil spring 21 tends normally to pull forward the wedge member 17 and the attached rod 10.

Figure 6:
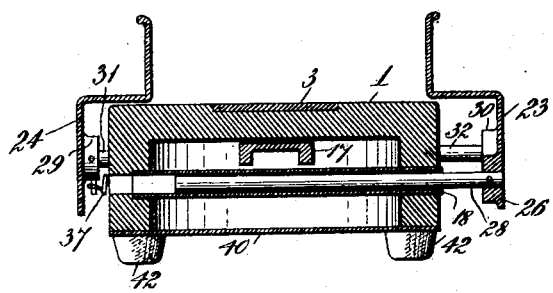
Fig. 6 is a section on line 6—6 of Fig. 4, viewed in the direction of the arrow.
Figure 7:
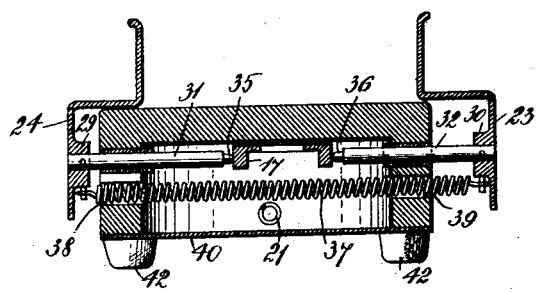
Fig. 7 is a section on line 7—7 of Fig. 4, viewed in the direction of the arrow.

Side plates 23 and 24 of shape best shown in Figs. 6 and 7 are mounted to slide laterally in the following manner: they are provided with lugs 25 and 26 respectively in which are mounted rods 27 and 28 respectively which fit closely and slidably in the bushings 18 and 19. The side plates 23 and 24 are also provided with lugs 29 and 30 respectively in which are mounted rods 31 and 32 respectively which pass through bushings 33 and 34 respectively in the sides of casing 1 and which are provided with inset hardened metallic tips 35 and 36 respectively which are adapted to bear normally on opposite sides of wedge member 17, being held normally in contact therewith by means of coil spring 37 which passes through opposite holes 38 and 39 in casing 1 and is attached at each end to a side plate. A base plate 40 covers the base of the casing and the parts contained therein. This plate 40 is held in place by screws 41, the heads of which are sunk in rubber tips 42.

In assembling my device and adjusting it for proper measurement of the foot or last, I place in the device a last of any length size but of an A width. This will cause a certain separation of side plates 23 and 24. The device is then turned over and, the plate 40 being removed, the position of the wedge member 17 is adjusted so that it bears firmly on the points 35 and 36 by turning the thumb nut 16 into such a position that when the toe plate 12 butts against the last, the post 15 will pass through the hole in the thumb nut. Thus when a foot or last is of A width the foot or last will not separate the side plates further than necessary to allow the foot to be accommodated between the heel and toe plates. If the foot or last is wider than A width the rod 10 will be pushed forward the distance of a full gradation on the scale for each unit of increased width. The reason for this is found in the angular relation of the sides of the wedge member 17 which permits the wedge to move forward, while remaining in contact with points 35 and 36, the distance of a length size for each one-twelfth of an inch that the points 35 and 36 are separated by the separation of the side plates 23 and 24 when they are forced apart by the increased width of a foot or last; a distance of one-twelfth of an inch representing a width size in case of men's shoes. The width size of a woman's shoe is one-sixteenth of an inch and the wedge member is constructed accordingly if the device is intended for measuring women's feet. From the foregoing will be readily apparent the correctness of my previous statement that when an A width of foot or last, of any length size, is inserted in the device the toe plate 12 on rod 10 will not be pushed further forward than the toe of the foot or last when it is also understood that for every unit of increase of length size the A width is one unit of width size greater, that is to say, in the case of men's shoes the A width of a seven size is one-twelfth of an inch greater than the A width of a shoe of six size.

The operation of my device is as follows: The foot or last to be measured is placed between the side pieces 23 and 24 with heel butted firmly against the heel plate 4. If it is a left foot, as shown in Fig. 1, both side plates will slide in unison slightly to the left to permit the proper alignment of the foot with respect to the heel plate 4 and toe plate 12. If it is a right foot they will slide slightly to the right in the same manner for a like purpose. The result of this, when it is a left foot, is to throw the wedge member 17 to the left, as shown in Fig. 3, this being permitted by its swivel attachment to the end of rod 10. The foot separates the side pieces 23 and 24 against the action of the spring 37 which holds the side pieces in firm engagement with the foot. The result of this separation permits the forward movement of the wedge member 17 which is actuated forward by spring 21. This in turn carries forward the rod 10 which is attached thereto. This will carry the toe piece 12 well forward of the toe of the foot accordingly as the foot is more than an A width. The rod 10 may then be pushed back to bring the toe piece 12 against the toe of the foot. The scale on plate 3 is so positioned that the reading on the indicator point 14 will then show the length-size of the foot or last. Thus in Fig. 1 the reading would be size 7. The rod 10 may then be released and will slide forward automatically a short distance. Each full unit of distance travelled represents a width in excess of size A. Thus in Fig. 1 the indicator would move forward from 7 to 10 thus indicating three sizes larger than A, namely size D, for width.

Thus it will be seen that my device is of simple, positive, and easy operation, and by reason of the speedy and accurate results obtained by the use thereof, the use of it will effect a great economy of time and effort in fitting shoes to the foot.

Having thus fully described my invention, what I claim is:

1. In a device of the character specified, the combination of a casing, a heel plate, a slidably mounted toe plate, side plates mounted to slide laterally with respect to said casing, a spring arranged to actuate said side plates each toward the other, and means connected with said toe plate whereby the free forward movement of said toe plate beyond its rearmost position is limited to a number of units of shoe-length size corresponding to the number of units of shoe-width size by which said side plates have been separated beyond their normal setting.

2. In a device of the character specified, the combination of a casing provided with a measuring scale showing shoe sizes in terms of length, a heel plate, a toe plate slidably mounted with reference to said scale and arranged to indicate readings thereon, side plates mounted to slide laterally with respect to said casing, a spring arranged to actuate said side plates each toward the other and means connected with said toe plate whereby the free forward movement of said toe plate beyond its rearmost position is limited to a number of scale units corresponding to the number of units of width size by which said side plates have been separated beyond their normal setting.

3. In a device of the character specified, the combination of a casing, a heel-plate, a slidably mounted toe-plate, side plates provided with members extending inwardly into said casing and mounted to slide laterally with respect to said casing, a spring arranged to actuate said side plates each toward the other, and a wedge-shaped member connected with said toe-plate and contacting normally with the inwardly extending members of said side plates whereby the free forward movement of said toe plate beyond its rearmost position is limited to a number of units of shoe-length size corresponding to the number of units of shoe-width size by which said side plates have been separated beyond their normal setting.

4. In a device of the character specified, the combination of a casing provided with a measuring scale showing shoe sizes in terms of length, a heel plate, a toe plate, slidably mounted with respect to said scale and arranged to indicate readings thereon, side plates provided with members extending inwardly into said casing and mounted to slide laterally with respect to said casing, a spring arranged to actuate said side plates each toward the other, and a wedge-shaped member connected with said toe plate and contacting normally with the inwardly extending members of said side-plates whereby the free forward movement of said toe plate beyond its rearmost position is limited to a number of scale units corresponding to the number of units of width size by which said side plates have been separated beyond their normal setting.

5. In a device of the character specified, the combination of a casing provided with a measuring scale, a heel plate, a toe plate movably mounted with reference to said scale, and arranged to indicate readings thereon, side plates mounted to slide laterally, both in unison and separately, with respect to said casing, a spring adapted to actuate said side plates each toward the other and means connected with said side plates and said toe plate whereby the separation of said side plates by a foot or last in operative relation with the device will cause a positioning of said toe plate with reference to said scale, thereby permitting the determination of the length and width of the foot or last with respect to shoe size in the manner described.

6. In a device of the character specified, the combination of a casing provided with a measuring scale, a heel plate, a toe plate movably mounted with reference to said scale and arranged to indicate readings thereon, side plates mounted to slide laterally with respect to said casing, a wedge-shaped member connected with said toe plate and slidably mounted between said side plates, members extending inwardly from said plates and slidably mounted in the sides of said casing and arranged to bear against the sides of said wedge-shaped member, and a spring adapted to actuate said side plates toward each other.

7. In a device of the character specified, the combination of a casing provided with a measuring scale, a heel plate, a toe plate movably mounted with reference to said scale and arranged to indicate readings thereon, side plates mounted to slide laterally, both in unison and separately, with respect to said casing, a wedge-shaped member pivotally connected with said toe plate and slidably mounted between said side plates, members extending inwardly from said side plates and slidably mounted in the sides of said casing and arranged to bear against the sides of said wedge-shaped member, and a spring adapted to actuate said side plates toward each other.

8. In a device of the character specified, the combination of a casing provided with a measuring scale, a heel plate, a toe plate movably mounted with reference to said scale and arranged to indicate readings thereon, side plates mounted to slide laterally, both in unison and separately, with respect to said casing, a wedge-shaped member pivotally connected with said toe plate and slidably mounted between said side plates, members extending inwardly from said side plates and slidably mounted in the sides of said casing and arranged to bear against the sides of said wedge-shaped member, a spring adapted to actuate said side plates toward each other, and a spring connected to said wedge-shaped member and adapted to actuate said wedge-shaped member in the direction towards which its sides converge.

In testimony whereof I have hereunto affixed my signature.

HAROLD E. CLARKE.